United States Patent
Nozawa et al.

(10) Patent No.: US 7,451,035 B2
(45) Date of Patent: Nov. 11, 2008

(54) VEHICLE CONTROL DEVICE

(75) Inventors: Toyohito Nozawa, Kariya (JP); Takekazu Terui, Kariya (JP); Yoshie Samukawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/085,477

(22) Filed: Mar. 21, 2005

(65) Prior Publication Data

US 2005/0216167 A1 Sep. 29, 2005

(30) Foreign Application Priority Data

Mar. 24, 2004 (JP) .............................. 2004-087411

(51) Int. Cl.
*G01S 13/66* (2006.01)

(52) U.S. Cl. ........................................ 701/93; 702/148

(58) Field of Classification Search ................... 701/93, 701/34, 70, 38, 41; 702/147, 148; 73/509, 73/514.39, 488
See application file for complete search history.

(56) References Cited

U.S. PATENT DOCUMENTS

| | | | | |
|---|---|---|---|---|
| 4,521,778 A | * | 6/1985 | Knepper | 342/134 |
| 5,126,942 A | * | 6/1992 | Matsuda | 701/75 |
| 5,320,076 A | * | 6/1994 | Reppich et al. | 123/399 |
| 5,617,337 A | * | 4/1997 | Eidler et al. | 702/104 |
| 6,122,577 A | * | 9/2000 | Mergenthaler et al. | 701/34 |
| 6,147,637 A | | 11/2000 | Morikawa et al. | |
| 6,195,157 B1 | * | 2/2001 | Yamashita et al. | 356/4.01 |
| 6,757,599 B2 | * | 6/2004 | Nada | 701/29 |
| 6,819,283 B2 | | 11/2004 | Okai et al. | |
| 6,989,745 B1 | * | 1/2006 | Milinusic et al. | 340/541 |
| 7,099,795 B1 | * | 8/2006 | Gerstenmeier et al. | 702/148 |
| 7,259,711 B2 | | 8/2007 | Okai et al. | |
| 2003/0016161 A1 | | 1/2003 | Okai et al. | |

FOREIGN PATENT DOCUMENTS

| | | |
|---|---|---|
| JP | 2001-225668 | 8/2001 |
| JP | 2002-196075 | 7/2002 |

OTHER PUBLICATIONS

Japanese Office Action dated Jul. 31, 2007.
Japanese Office Action dated Nov. 27, 2007.
Chinese Office Action dated Nov. 16, 2007.

* cited by examiner

*Primary Examiner*—Dalena Tran
(74) *Attorney, Agent, or Firm*—Harness, Dickey & Pierce, PLC

(57) ABSTRACT

First, it is determined that a measurable distance of a laser radar device is a first threshold value being an extremely short measurable distance or below, because of dirt on a sensor or bad weather. A vehicle control using measured data of the device is thereby prohibited. Second, it is determined that the measurable distance is a second threshold value being a short measurable distance or below but greater than the first threshold value, because of dirt on a sensor or bad weather. A vehicle speed for allowing the vehicle control using the measured data of the device is restricted. Eventually, the vehicle control is executed under these individual conditions.

8 Claims, 4 Drawing Sheets

VEHICLE CONTROL DEVICE

CROSS REFERENCE TO RELATED APPLICATIONS

This application is based on and incorporates herein by reference Japanese Patent Application No. 2004-87411 filed on Mar. 24, 2004.

FIELD OF THE INVENTION

The present invention relates to a vehicle control device that is provided in a subject vehicle and performs a vehicle control based on data measured by an optical measurement device such as a laser radar device. Further, it relates to a program in use for this vehicle control device.

BACKGROUND OF THE INVENTION

There is known a laser radar device or a following-distance sensor that measures a following distance to preceding vehicle using laser beams. Here, the laser radar device emits laser beams forward of a subject vehicle and receives beams reflected from the preceding vehicle. The device thereby determines the distance or orientation to the preceding vehicle based on the received beams. Using the determined distance or orientation, vehicle controls such as following-distance control to the preceding vehicle are conducted.

This conventional device lowers its detection capability or measurement capability when dirt is attached to device's portions for emitting or receiving laser beams. A system where a vehicle control is performed using the measured results is stopped when the measurement capability (or measurable distance) is lowered. (Refer to Patent Document 1.) This poses a problem that the device has a low working ratio since the system is simply cancelled when the measurement capability becomes low.

Patent Document 1: JP-2002-196075 A

SUMMARY OF THE INVENTION

It is an object of the present invention to provide a vehicle control device having a high working ratio, and a program related to this device.

To achieve the above object, a vehicle control device that is provided in a vehicle and executes a vehicle control using data measured by an optical measurement device is provided with the following. A decrease is detected in a measurement capability of the optical measurement device. A speed of the vehicle is detected. Here, the vehicle control using the measured data is restricted based on the detected speed when the decrease in the measurement capability is detected.

In this structure, when it is detected that the detection capability is lowered, the vehicle control using the measured results is restricted based on the speed of the subject vehicle. For instance, when a laser radar device decreases its measurable distance because of visible dirt or bad weather, it is not preferable from a safety aspect that the following-distance control or the like is conducted based on the measured results by using the degrading device. Therefore, in this invention, when the device lowers its capability, performing of the following-distance control is restricted based on the vehicle speed. For instance, in an expressway, the control is stopped. This enhances safety during the high-speed traveling. In contrast, during the low-speed traveling, performing of the following-distance control is allowed even with the capability being degraded. This thereby widens the working ratio of the control using the measured results from the optical measurement device.

In another aspect of this invention, a vehicle control device that is provided in a vehicle and executes a vehicle control using data measured by an optical measurement device is provided with the following. A decrease is detected in a measurement capability of the optical measurement device. A speed of the vehicle is detected. Here, measurement of the optical measurement device is restricted based on the detected speed when the decrease in the measurement capability is detected.

In this structure, when it is detected that the detection capability is lowered, the measurement of the optical measurement device is restricted based on the speed of the subject vehicle. For instance, when a laser radar device decreases its measurable distance because of visible dirt or bad weather, the operation or computation of measurement is stopped or the measured results are not outputted. This helps prevent the vehicle control using the measured results obtained from the degrading device. Therefore, similar to in the foregoing aspect, this enhances safety during the high-speed traveling. In contrast, during the low-speed traveling, the following-distance control using the measured results is allowed even with the capability being degraded. This also widens the working ratio of the control using the measured results from the optical measurement device.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

A vehicle control device according to a first embodiment of the present invention is included in a vehicular system (shown in FIG. 1) mounted in a subject vehicle. Here, the vehicle control device 1 is a drive control ECU (Electronic Control Unit) 1 to perform a vehicle control such as a following-distance control using a laser radar device 3 to measure a distance to an object (e.g., preceding vehicle) ahead of the vehicle by laser beams.

Figure 1:
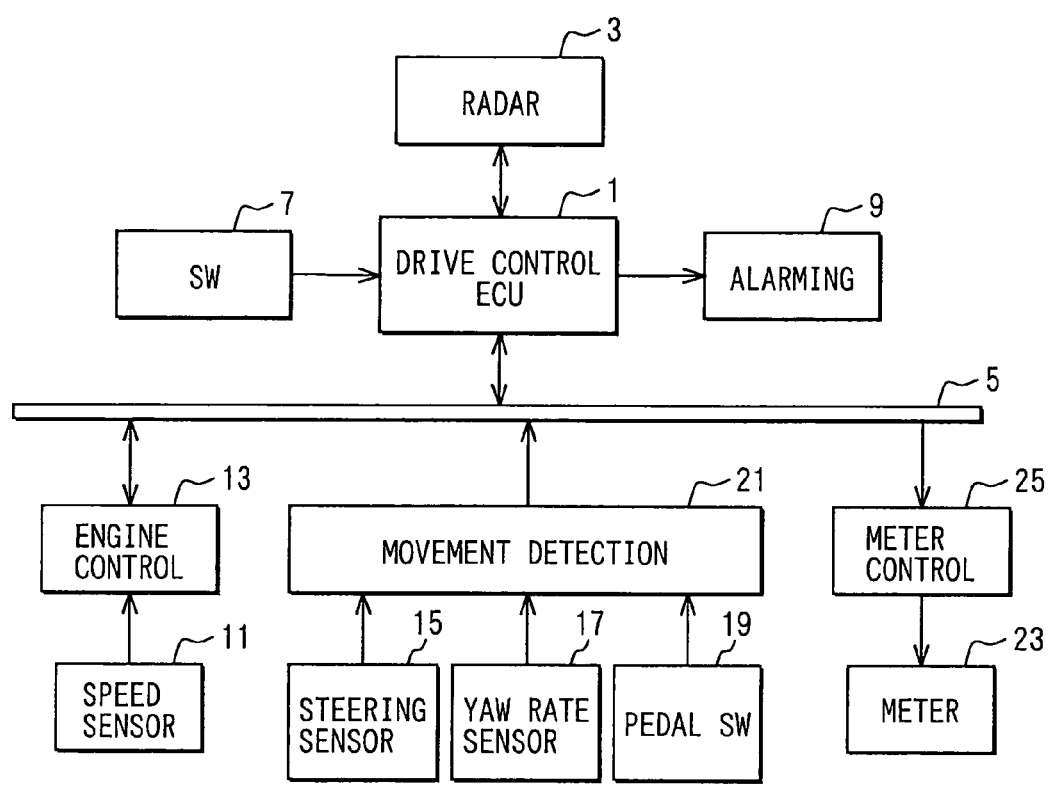
FIG. 1 is a diagram showing a schematic structure of a vehicular system including a vehicle control device according to a first embodiment of the present invention.

The vehicle control device 1 connects to the laser radar device 3, a manipulation switch 7, an alarming unit 9, and an in-vehicle LAN (Local Area Network) 5, as shown in FIG. 1. The manipulation switch 7 is connected for inputting starting or setting of the following-distance control. The alarming unit 9 is connected for notifying abnormalities. The in-vehicle LAN 5 is further connected to an engine control device 13, a vehicle-movement detection device 21, and a meter control device 25. The engine control device 13 controls an engine by receiving signals from a vehicle speed sensor 11, e.g., during the following-distance control. The vehicle-movement detection device 21 inputs signals of vehicle movements from a steering sensor 15, a yaw rate sensor 17, and a brake pedal switch 19. The meter control device 25 controls a meter 23.

Under this structure, the vehicle control device 1 drives the engine control device 13 or the like to perform the following-distance control based on the measurement results by the laser radar device 3 and the signals from the various sensors, when the manipulation switch 7 is manipulated.

The laser radar device 3 emits laser beams from an LD (Laser Diode) to detect a measurement object based on the reflected laser beams using a given control program. The laser radar device 3 further obtains a distance from the subject vehicle to the measurement object based on the elapsed time from when emitting to when receiving. The laser radar device 3 furthermore obtains an orientation of the measurement object based on the information of emitting direction of the laser beams.

Next, the control processes executed by the laser radar device 3 will be explained below. These control processes prohibits the vehicle control or restrict the execution of the vehicle control based on the vehicle speed.

Figure 2:
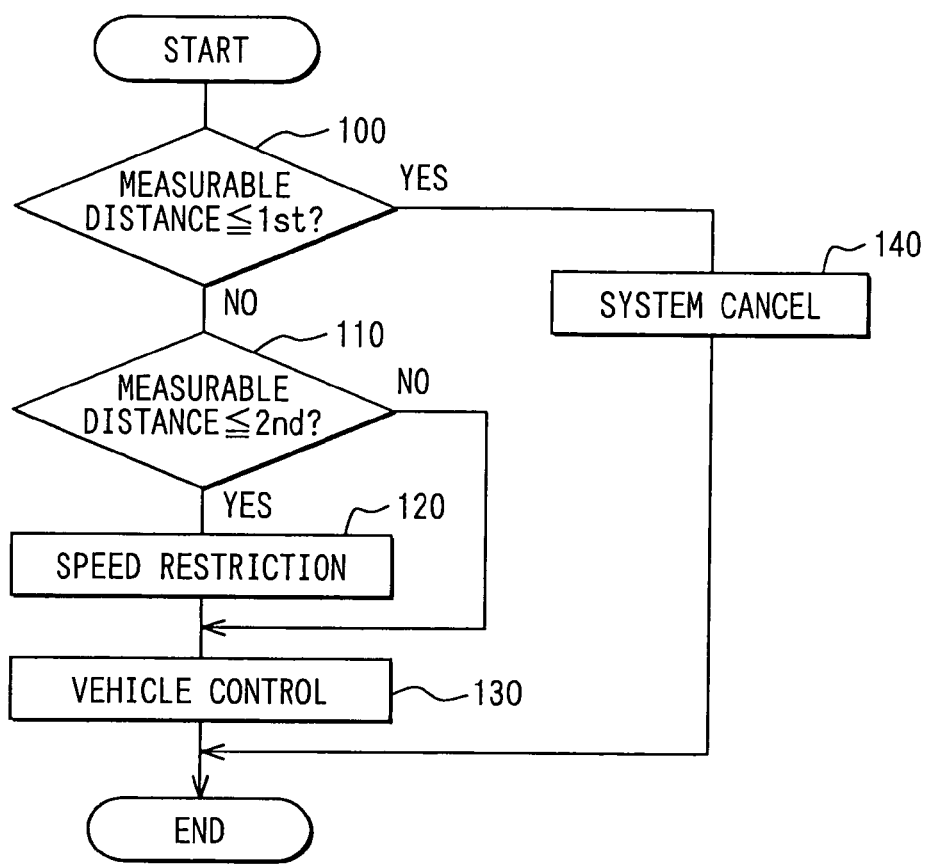
FIG. 2 is a flow chart diagram of a control process according to the first embodiment.

As shown in FIG. 2, at Step 100, it is determined whether a measurable distance of the laser radar device 3 is equal to or below a first threshold value B that is an extremely short measurable distance (e.g., 50 meters), because of dirt on a sensor or bad weather. The affirmative determination at Step 100 advances the sequence to Step 140, while the negative determination advances to Step 110. Here, the measurable distance is the longest distance that the laser radar device is able to measure. Further, the dirt on the sensor can be detected by variations of strength or amount of the beams that reflect on an optical glass surface when the laser beams are emitted. The dirt can be also detected by the following. Namely, a distance from which detection of an object is executed and a distance to which the detection is executed are previously stored, so over-time variations of these distances are used for detecting the dirt. For instance, decrease of the distances means that the surface of the sensor becomes dirty. Further, the bad weather can be detected by various sensors that detect rain or outside light.

At Step 140, the vehicle control using the measurement results of the laser radar device 3 is stopped or prohibited because the measurable distance is too short. It refers to system cancel. Namely, in the case that the measurable distance becomes a significantly short distance, e.g., 50 meters or below, because of the dirt on the sensor or the bad weather, the following-distance control is prohibited. It is because that it is unfavorable that the following-distance control be executed using the measured data from the laser radar device 3 having the significantly short measurable distance.

On the other hand, at Step 110, it is determined whether a measurable distance of the laser radar device 3 is equal to or below a second threshold value A (e.g., 100 meters) that is short but longer than the first threshold value B, because of dirt on the sensor or bad weather. The affirmative determination at Step 110 advances the sequence to Step 120, while the negative determination advances to Step 130.

At Step 120, the vehicle control using the measured data of the laser radar device 3 is restricted depending on the speed of the subject vehicle. It refers to speed restriction. That is, the vehicle control is allowed to take place only at 80 km/h or below. Namely, in the case that the measurable distance becomes a relatively short distance, e.g., 100 meters or below, because of the dirt on the sensor or the bad weather, the following-distance control using the measured data from the laser radar device 3 having the relatively low measurable distance is unfavorable and thereby prohibited during the high-speed traveling of the subject vehicle.

At Step 130 moved from Step 110 or Step 120, the vehicle control is performed under the relevant conditions, respectively, and then the process ends.

As explained above, in the first embodiment, the vehicle control is executed as follows. With the measurable distance exceeding the second threshold value (e.g., 100 meters), the vehicle control is executed by using the measured data from the laser radar device 3 without the vehicle speed limited; with the measurable distance being the second threshold value or below, the vehicle control is allowed only at the vehicle speed of a given speed (e.g., 80 km/h) or less; and with the measurable distance being the first threshold value (e.g., 50 meters) or below, the vehicle control is prohibited at any vehicle speed.

Thus, in this embodiment, in the case that the measurable distance is the first threshold value or below, the vehicle control is prohibited, so that safety during the traveling of the subject vehicle can be enhanced. Further, in the case that the measurable distance is over the first threshold value, and equal to the second threshold value or below, the vehicle control is restricted based on the speed, so that safety during the traveling of the subject vehicle can be enhanced similarly. Here, the vehicle control is restricted based on the speed unlike the conventional device where the system is simply alternatively cancelled or executed based on the measurable distance. This produces an effect that can widen the working ratio of the system. That is, even when the measurable distance becomes shorter, the vehicle control is executed without the system being cancelled as long as the speed is lower than a given speed, which produces a significant feature that the working ratio and the working area of the device or the system is increased than the conventional ones.

Second Embodiment

Figure 3:
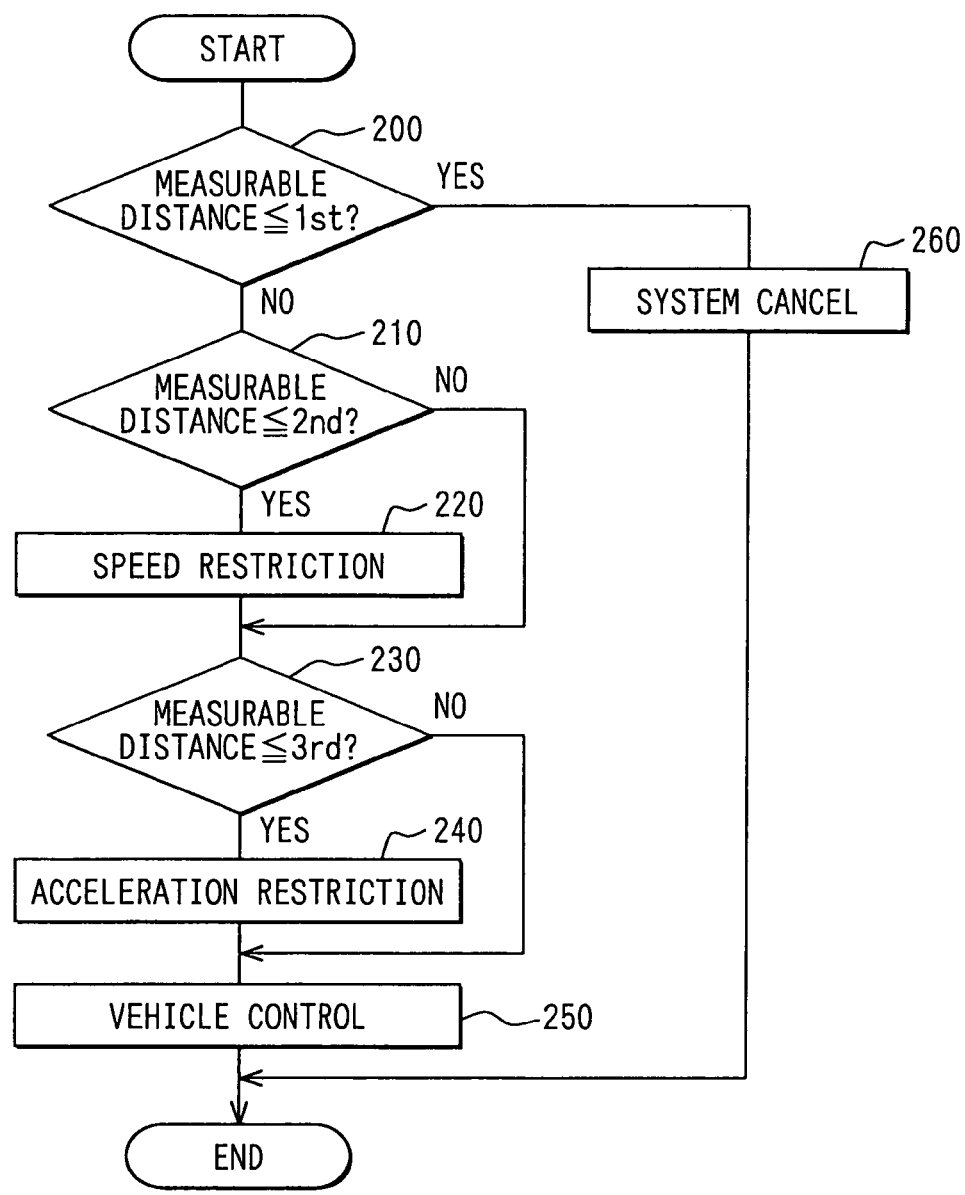
FIG. 3 is a flow chart diagram of a control process according to a second embodiment of the present invention.

A vehicle control device according to a second embodiment of the present invention will be explained by abbreviating the same structure as the first embodiment, with reference to FIG. 3. This embodiment includes acceleration restriction based on a third threshold value, in addition to the system cancel and the speed restriction in the process of the first embodiment.

At Step 200 in FIG. 3, it is determined whether a measurable distance of the laser radar device 3 is equal to or below a first threshold value B that is an extremely low measurable distance (e.g., 50 meters), because of dirt on a sensor or bad weather. The affirmative determination at Step 200 advances the sequence to Step 260, while the negative determination advances to Step 210.

At Step 260, the vehicle control using the measurement results of the laser radar device 3 is stopped or prohibited because the measurable distance is too short. It refers to system cancel. On the other hand, at Step 210, it is determined whether a measurable distance of the laser radar device 3 is equal to or below a second threshold value A (e.g., 100 meters) that is short but longer than the first threshold value B, because of dirt on the sensor or bad weather. The affirmative determination at Step 210 advances the sequence to Step 220, while the negative determination advances to Step 230.

At Step 220, the vehicle control using the measured data of the laser radar device 3 is restricted depending on the speed of the subject vehicle. It refers to speed restriction.

At Step 230, it is determined whether the measurable distance of the laser radar device 3 is equal to or below a third threshold value (e.g., 120 meters) that is longer than the second threshold value A, because of dirt on the sensor or bad weather. The affirmative determination at Step 230 advances the sequence to Step 240, while the negative determination advances to Step 250.

At Step 240, an acceleration during the vehicle control is restricted to a given acceleration or below because the measurable distance is a little short. It refers to acceleration restriction. Namely, in the case that the measurable distance becomes a little short distance (e.g., 120 meters) or below, because of the dirt on the sensor or the bad weather, the high acceleration during the following-distance control is prohibited. It is because that it is unfavorable that the high acceleration be executed during the following-distance control using the measured data from the laser radar device 3 having the slightly low measurable distance.

At Step 250 moved from Step 230 or Step 240, the vehicle control is performed under the relevant conditions, respectively, and then the process ends. Namely, this vehicle control is executed by using the vehicle speed and the vehicle acceleration based on the variations of the measurable distance due to the dirt on the sensor or the bad weather.

Under the above structure of the second embodiment, the same effect as the first embodiment is provided. Further, because the acceleration is restricted based on the determination using the third threshold value, the following-distance control using the measured data can be executed more safely.

Third Embodiment

Figure 4:
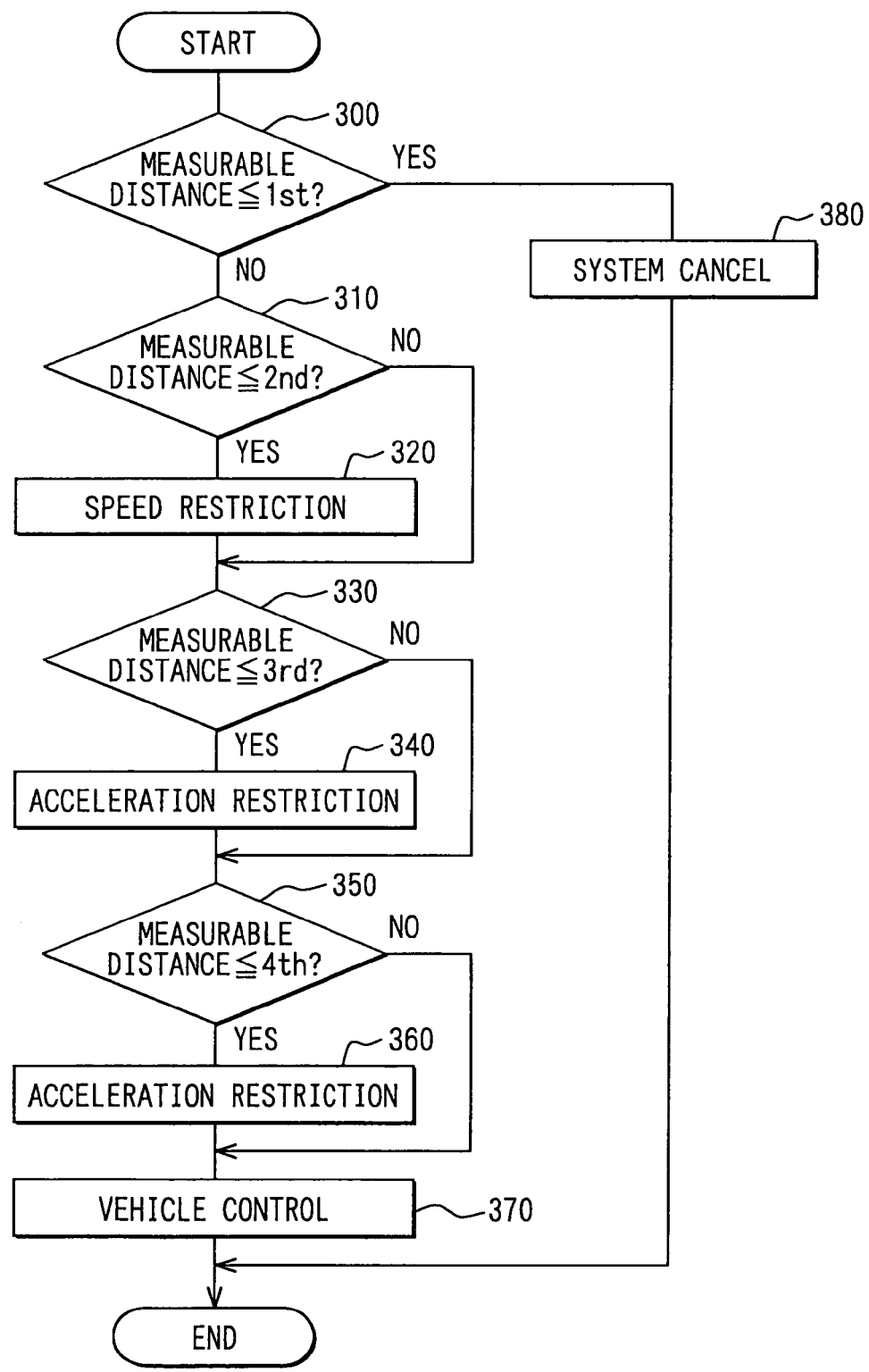
FIG. 4 is a flow chart diagram of a control process according to a third embodiment of the present invention.

A vehicle control device according to a third embodiment of the present invention will be explained by abbreviating the same structure as the second embodiment, with reference to FIG. 4. This embodiment includes acceleration restriction based on a fourth threshold value, in addition to the system cancel, the speed restriction, and the acceleration restriction based on a third threshold value in the process of the second embodiment.

At Step 300 in FIG. 3, it is determined whether a measurable distance of the laser radar device 3 is equal to or below a first threshold value B that is an extremely low measurable distance (e.g., 50 meters), because of dirt on a sensor or bad weather. The affirmative determination at Step 300 advances the sequence to Step 380, while the negative determination advances to Step 310.

At Step 380, the vehicle control using the measurement results of the laser radar device 3 is stopped or prohibited because the measurable distance is too short. It refers to system cancel. On the other hand, at Step 310, it is determined whether the measurable distance of the laser radar device 3 is equal to or below a second threshold value A (e.g., 100 meters) that is short but longer than the first threshold value B, because of dirt on the sensor or bad weather. The affirmative determination at Step 310 advances the sequence to Step 320, while the negative determination advances to Step 330.

At Step 320, the vehicle control using the measured data of the laser radar device 3 is restricted depending on the speed of the subject vehicle. It refers to speed restriction.

At Step 330, it is determined whether the measurable distance of the laser radar device 3 is equal to or below a third threshold value (e.g., 120 meters) that is longer than the second threshold value A, because of dirt on the sensor or bad weather. The affirmative determination at Step 330 advances the sequence to Step 340, while the negative determination advances to Step 350.

At Step 340, an acceleration during the vehicle control is restricted to a given acceleration or below because the measurable distance is a little short. It refers to acceleration restriction.

At Step 350, it is determined whether the measurable distance of the laser radar device 3 is equal to or below a fourth threshold value (e.g., 150 meters) that is longer than the third threshold value, because of dirt of the preceding vehicle or the like. The affirmative determination at Step 350 advances the sequence to Step 360, while the negative determination advances to Step 370.

Here, decrease in the measurable distance due to the dirt of the preceding vehicle is determined by the strength of the reflected beams. For instance, in a case that a measurable distance is longer than a given distance, when the strength of the reflected beams is below a given strength, it is determined that the preceding vehicle is dirty. In detail, a parameter is set as follows: {measurable distance x (reception strength/reference strength) x coefficient}. When this parameter is below a given value, it is determined that the preceding vehicle is dirty.

At Step 360, an acceleration during the vehicle control is restricted to a given acceleration or below since the measurable distance is decreased (e.g., to 150 meters or below) because of the dirt on the preceding vehicle. It refers to another acceleration restriction. Namely, in the case that the measurable distance decreased because of the dirt of the preceding vehicle or the like, the high acceleration during the following-distance control is prohibited. It is because that it is unfavorable that the high acceleration be executed during the following-distance control using the measured data from the laser radar device 3 whose measurable distance is decreased.

At Step 370 moved from Step 350 or Step 360, the vehicle control is performed under the relevant conditions, respectively, and then the process ends. Namely, this vehicle control is executed not only by using the vehicle speed and the vehicle acceleration based on the variations of the measurable distance due to the dirt on the sensor or the bad weather, but also executed by using the vehicle acceleration based on the variations of the measurable distance due to the dirt of the preceding vehicle.

Under the above structure of the third embodiment, the same effect as the second embodiment is provided. Further, because the acceleration is also restricted based on the determination using the fourth threshold value, the following-distance control using the measured data can be executed further more safely.

(Modifications)

(1) In the above embodiments, the following-distance control using the measurement data by the laser radar device is explained; however, this invention can be directed to another vehicle control (e.g., adaptive cruise control or constant-speed traveling control) using the same measurement data.

(2) The individual steps of the above embodiments can be combined with one another as needed. For instance, when the measurable distance is lowered because of the dirt of the preceding vehicle, not only acceleration restriction but also speed restriction can be applied. For instance, in FIG. 4, one or some of the determinations and controls based on their results can be selectively executed. Further, for instance, magnitude relation among the second to fourth threshold values can be modified as needed; here, determination is executed from the shortest threshold distance.

(3) The functions of the vehicle control device can be achieved by a process executed by a program of a computer. Here, the program can be stored in a floppy disk, a magneto-optic disc, a DVD-ROM, a CD-ROM, a hard disk or the like that is computer-readable, and executed after being downloaded to the computer. Further, the program can be stored in a ROM or a backup RAM used as the computer-readable storage medium, so this ROM or the backup RAM can be assembled to the computer to be used.

It will be obvious to those skilled in the art that various changes may be made in the above-described embodiments of the present invention. However, the scope of the present invention should be determined by the following claims.

What is claimed is:

1. A vehicle control device that is provided in a vehicle and executes a vehicle control, the vehicle control device comprising:
    an optical measurement device installed in the vehicle for detecting a measurement object to measure data pertinent to the measurement object;
    capability detecting means that detects a decrease in a measurement capability of the optical measurement device; and
    vehicle-control restricting means that restricts by varying the vehicle control, which uses data measured by the optical measurement device, in a plurality of steps based on a comparison of the detected decrease in the measurement capability with a plurality of threshold values.

2. The vehicle control device of claim 1, wherein the capability detecting means detects the decrease, which derives from the optical measurement device itself, in the measurement capability of the optical measurement device.

3. The vehicle control device of claim 1,
    wherein the capability detecting means detects the decrease, which derives from an external reason other than the optical measurement device itself, in the measurement capability of the optical measurement device.

4. The vehicle control device according to claim 1,
    wherein when the detected decrease is greater than a first threshold value, as a first step the vehicle control is stopped regardless of a speed of the vehicle.

5. The vehicle control device according to claim 4, further comprising:
    speed detecting means installed in the vehicle for detecting a speed of the vehicle,
    wherein when the detected decrease is not greater than the first threshold value and greater than a second threshold value smaller than the first threshold value, as a second step the vehicle control is stopped when the detected speed of the vehicle exceeds a predetermined value.

6. The vehicle control device according to claim 5, further comprising:
    acceleration detecting means installed in the vehicle for detecting an acceleration of the vehicle,
    wherein when the detected decrease is not greater than the second threshold value and greater than a third threshold value smaller than the second threshold value, as a third step the vehicle control to allow an acceleration exceeding a predetermined value is stopped.

7. The vehicle control device according to claim 1,
    Wherein when the detected decrease is greater than a first threshold value, as a first step detecting the measuring object is stopped regardless of a speed of the vehicle.

8. A computer program product in a computer-readable medium for use in a vehicle control device that is provided in a vehicle and performs a vehicle control using data measured by an optical measurement device, the computer program product comprising:
    instructions for detecting a decrease in a measurement capability of the optical measurement device, which is installed in the vehicle; and
    instructions for restricting by varying the vehicle control, which uses the measured data, in a plurality of steps based on a comparison of the detected decrease in the measurement capability with a plurality of threshold values.

* * * * *